United States Patent [19]

Sharp et al.

[11] 4,364,686
[45] Dec. 21, 1982

[54] LOCKING DEVICE FOR GRID SYSTEM

[75] Inventors: Joseph F. Sharp, Norwalk; Ormond S. Sutter, Placentia; Philip W. Cornwell, Newport Beach, all of Calif.

[73] Assignee: Lok Products Company, Fullerton, Calif.

[21] Appl. No.: 207,212

[22] Filed: Nov. 17, 1980

[51] Int. Cl.³ .............................................. F16B 7/22
[52] U.S. Cl. ...................................... 403/347; 52/667
[58] Field of Search ...................... 403/346, 347, 252; 52/667

[56] References Cited

U.S. PATENT DOCUMENTS 3,511,012  5/1970  Brady ................................... 52/667
4,106,878  8/1978  Jones ............................... 403/346 X Primary Examiner—Andrew V. Kundrat
Attorney, Agent, or Firm—Lyon & Lyon

[57] ABSTRACT

An apparatus for constructing an interlocked grid system which may be suspended from the main structure of a building for use as a ceiling panel support is disclosed in which transverse members interlock with suspendable support members. A tongue on each end of opposing transverse members communicates with a rectangular hole in the support member. The upper and lower edge of each tongue is deflected to form upper and lower shoulders which face backward toward the transverse member. Upon insertion of the tongue into the rectangular hole, the shoulders engage the support member at the upper and lower ends of the rectangular hole. The leading end of the tongue is wedged and maintained in position within the orifice by a centrally located reinforcement bead on the opposing transverse member. The reinforcement bead extends across the junction of the tongue with the transverse member to perform a reinforcing function as well as the wedging function. In one embodiment, retaining tab is provided in the tongue for retaining the first transverse member within the support member orifice until the opposing transverse member is inserted to complete the joint.

8 Claims, 6 Drawing Figures

LOCKING DEVICE FOR GRID SYSTEM

BACKGROUND OF THE INVENTION

This invention relates to transversely inter-locking structural members which form a grid system. More particularly, this invention relates to the design of the interlocking members of such a grid system which may be used to depend a false ceiling from the main structure of a building and for the displacement and retention of sealing panels or sections within the grid.

Suspended ceilings are widely used today in many types of buildings. Typically, the support members are attached to suspension wires which are depended from the building structure. The transverse members are then inserted into the support members to form the grid system of the suspended ceiling.

Certain desirable characteristics for such a system, such as inexpensive manufacture of component parts, ease of assembly, high pull-out strength, and ease of disassembly, have been found to be difficult to incorporate within a single design. A design which provides for ease of assembly, often suffers from low pull-out strength and other operational deficiencies. A design which provides for ease of assembly coupled with high performance characteristics often will suffer from expensive manufacture of the component parts and an inability to disassemble the grid. Therefore, it would be desirable to have a design for an inter-locking grid system, which system exhibits the characteristics of inexpensive manufacture of the component parts, ease of assembly, high performance characteristics, (including high pullout strength and sufficient rigidity) and disassembly potential. In addition, because the work space within which the ceilings must be hung may often be limited, it would also be desirable for the connection between the grid members to be accomplished with a minimum of movement of the individual grid members. Finally, of course, the resultant grid system should be attractive as it will be visible to the room occupants.

SUMMARY OF INVENTION

The present invention is directed toward an interconnecting grid system which overcomes the limitations of the prior art and presents a grid system which incorporates the often conflicting characteristics outlined above.

The apparatus of the present invention comprises a longitudinal support member of substantially solid construction having therein at spaced intervals rectangular holes. The transverse members, of similar construction to the support member, have tongues extending longitudinally from each end which engage the rectangular holes in the support member to construct the grid system. Each extending tongue of the transverse members has substantially two sections, a tab section adjacent to the support member and an insert portion which engages the rectangular hole. A reinforcement bead which extends from the transverse member onto the tab section provides reinforcement against bending of the tongue. The top and bottom of the insert portion are deflected to create upper and lower shoulders, which engage the upper and lower sides of the rectangular hole once the insert has entered the hole. In this manner, any pull-out force is exerted by the shoulders against the strongest portion of the rectangular hole—its top and bottom—rather than at its weakest point—its middle.

The hole is sized to admit two inserts of opposing transverse members. When the members are so inserted, the insert portion of each rests upon the reinforcement bead of the other so as to provide a rigid connection. The shoulders of the opposing insert portions abut opposing sides of the hole to prevent the transverse members from withdrawing from the hole.

Because only the top and bottom portions of the inserts are offset, and because the insert is held in position by the centrally located reinforcement bead, the opposing transverse members may be withdrawn from the hole by twisting the transverse members within the hole to free one shoulder (either the upper or lower shoulder) of the insert and pulling back to dislodge that shoulder from the side of the hole, and then twisting the transverse member in the opposite direction to dislodge the opposite shoulder from the side of the hole. The transverse member will then be easily withdrawn from the hole.

To prevent the first transverse member from withdrawing from the hole before the second member can be inserted to complete the joint, a retaining tab may be formed in the insert portion of the tongue of the first transverse member. The tab will present a rearward facing shoulder extending a sufficient distance away from the insert portion such that withdrawal of the member from the hole will not occur haphazardly.

It is therefore the object of this invention to provide an improved inter-locking grid system which overcomes the limitations of the prior art.

Other and further objects and advantages of this invention will be apparent to those skilled in the art upon a review of the figures, the detailed description of the preferred embodiment and the appended claims.

DETAILED DESCRIPTION OF THE PREFERRED EMBODIMENT

Figure 1:
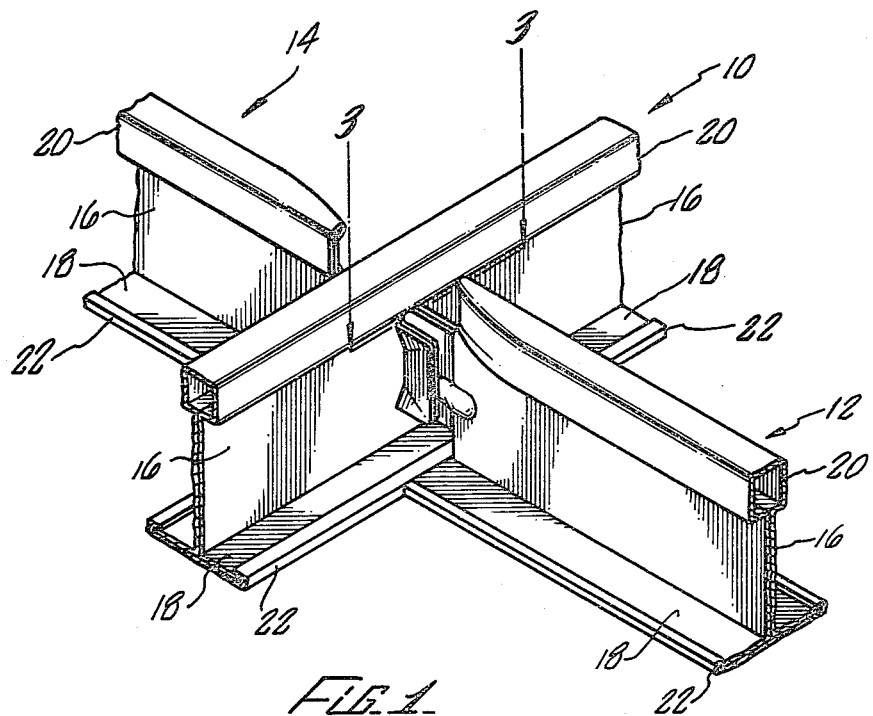
FIG. 1 is a perspective view of an inter-locking grid system according to the present invention in assembled form.
Figure 2:
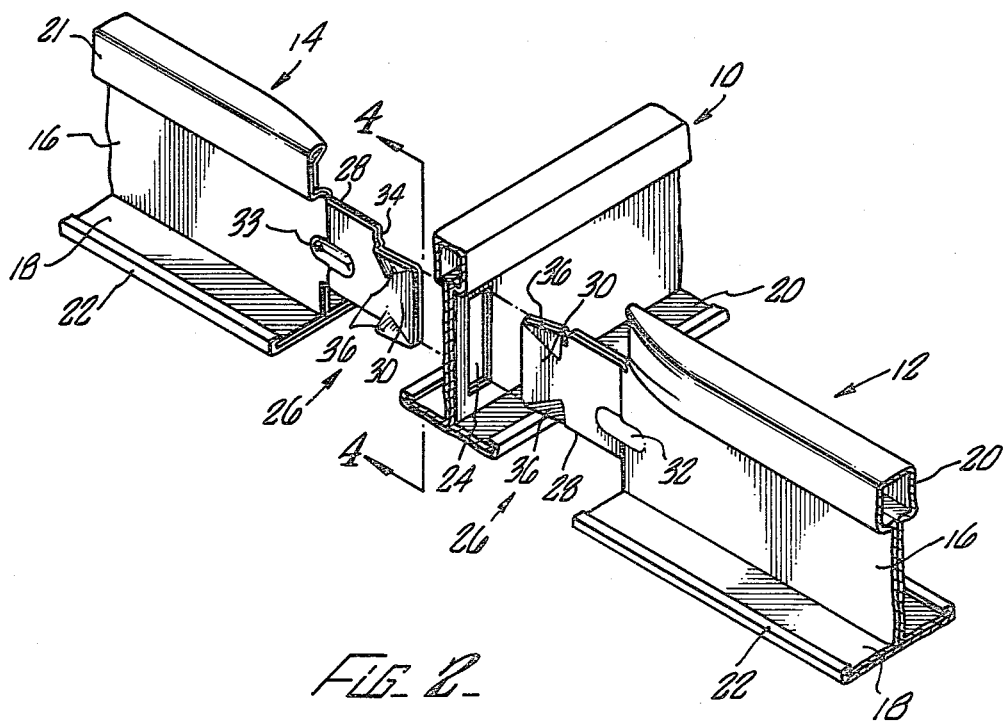
FIG. 2 is an exploded perspective view of the apparatus of FIG. 1, prior to assemblage, showing the insert portion of the transverse members and the manner in which they are inserted into the orifice of the longitudinal support member.

The apparatus of the present invention, comprising a longitudinal support member, generally designated 10, and opposing transverse support members, generally designated 12, and 14, is typically constructed of zinc coated steel which has been roll formed to the desired shape. The support member 10 and the transverse members 12 and 14 are of substantially similar cross-section, resembling an inverted "T", comprising a central double thick web 16, lower support flanges 18, upon which the ceiling tiles (not shown) rest, and an upper tubular portion 20. The upper tubular portion 20 provides strength, reinforcement, and rigidity to the various members. Facing 22, comprising decoratively attired steel, is attached to lower flanges 18 to present an attractive surface which will be visible to the occupants of the room in which the suspended ceiling is used.

Figure 3:
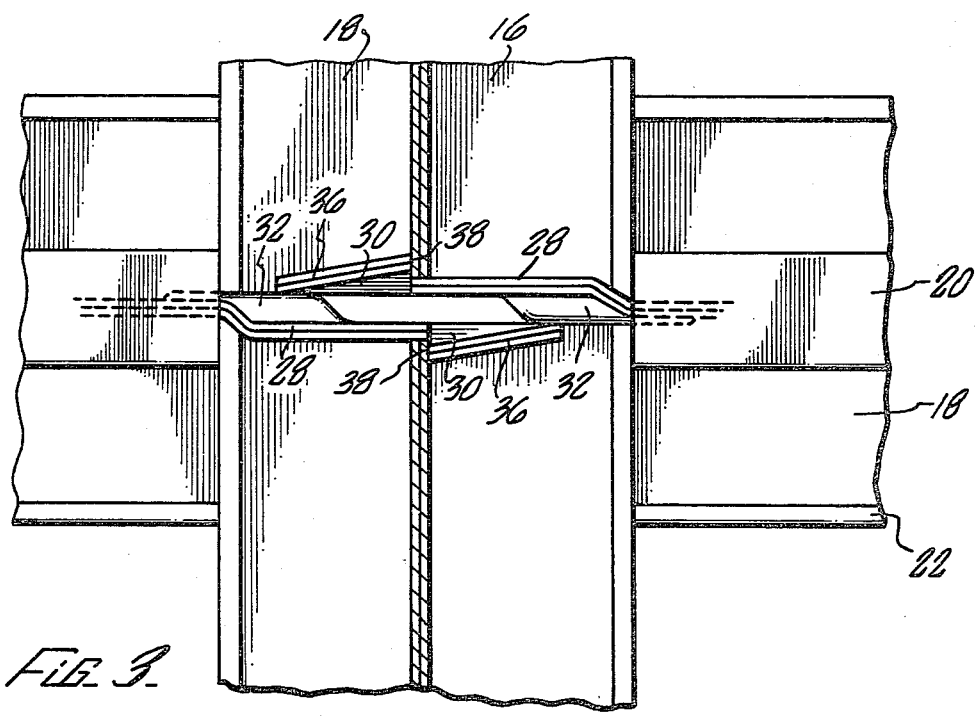
FIG. 3 is a top view taken along line 3—3 in FIG. 1 showing the relationship of the inserts of the opposing transverse members upon assemblage.
Figure 4:
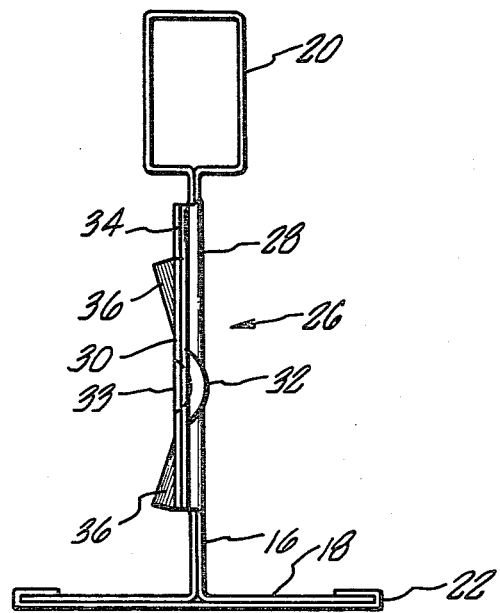
FIG. 4 is a side view of a transverse member taken along line 4—4 in FIG. 2 showing the shape of the insert.

Turning now to the inter-locking features of the invention, a tongue, generally designated 26, extends longitudinally from the traverse members 12 and 14. In the preferred embodiment, tongue 26 is an extension of web 16, however, tongue 26 could be attached to the transverse members 12 and 14 by any suitable means. The tongue 26 comprises tab portion 28 and insert portion 30. The tongue 26 is of double thick construction similar to web 16. The tongue 26 is offset slightly from the line of the web 16, as best seen in FIG. 3, to allow the opposing transverse members 12 and 14 to lie in a straight line transverse to the support member 10 when the tongues 26 of opposing transverse members are inserted into hole 24 in side by side fashion. The amount of offset is equal to the combined width of web 16 and reinforcement bead 32. Reinforcement bead 32 is formed transversely across the connection line between web 16 and tab 28. Reinforcement bead 32 is formed by deforming the metal of web 16 and tab 28 to cause the metal to distend to form reinforcement bead 32 on one side of the transverse member and corresponding indention 33 on the opposing side of the transverse member. Reinforcement bead 32 provides two functions. First, it provides reinforcement for tongue 26 to keep tongue 26 from being easily bent along the connection line between tab 28 and web 16. Second, it provides a wedge function whereby insert 30 of the opposing transverse member, upon the insertion of both opposing inserts through hole 24, engages bead 32 to maintain the opposing insert 30 in proper position within hole 24.

The insert portion 30 of tongue 26 is an extension of tab 28 and is similarly constructed of the double thick material. The height of insert 30 is reduced relative to tab 28 to create shoulder 34 which will abut web 16 when insert 30 is placed in hole 24. The top and bottom corners of inserts 30, near tab 28, are bent outward toward the side of the transverse members 12 and 14 on which indention 33 lies to form upper and lower wings 36. The amount of deformation of wings 36 is equal, at its greatest point, to the thickness of tab 28. This deformation of wings 36 creates rearward facing shoulders 38. The importance of this manner of deformation and the placement of the shoulders 38 will be more fully explained infra. The center portion of insert 30 remains in the line with tab 28, as best seen in FIG. 3.

It will be noted that tongues 26 on the opposing transverse members 12 and 14 have reverse orientations such that when the tongues 26 of the opposing transverse members 12 and 14 are situated within hole 24, the inserts 30 will reside on reinforcement beads 32 of one another and the shoulders 38 will engage opposite size of hole 24. It will also be understood that in order to construct a continuous grid, the transverse members 12 and 14 will have tongues 26 at both of their ends, the tongues 26 being reversely oriented.

To connect the opposing transverse members 12 and 14 to support member 10, one of the inserts 30 is first placed in hole 24 and positioned such that shoulders 38 engage one side of hole 24. The insert 30 of the other transverse member is then guided to the remaining space of hole 24 not occupied by the tongue 30 of the opposing transverse member and forced into place, shoulders 38 engaging the opposing sides of hole 24. It will be noted that shoulders 38 engage the sides of hole 24 at its upper and lower edges, where the hole is most resistant to deformation, rather than at the middle of the hole where the sides of the hole could be more easily bent allowing withdrawal of the transverse members.

To disconnect the assembly, either transverse member is twisted slightly to disengage either the upper or lower shoulder 38 from the side of hole 24. This twisting motion is possible due to the fact that reinforcement bead 32 is centrally located relative to the opposing insert 30, and does not extend the full width of the opposing insert 30. Therefore, by twisting either transverse member, the insert 30 is allowed to seesaw on reinforcement bead 32. This twisting action, which is easily accomplished by hand, brings one of the shoulders 38 out of engagement with the side of hole 24. By pulling that transverse member away from the support member 10, that shoulder 38 will be completely disengaged from the side of hole 24 and will be positioned within hole 24 and will not snap back into position. This allows the transverse member to be twisted in the opposite position to allow the other shoulder 38 to be disengaged from the side of the hole 24. At this point, both shoulders have been disengaged from the side of the hole 24 and the transverse member may be disengaged. This of course frees the opposing transverse member which may then easily be removed from hole 24.

Therefore, it will be understood that through simple manual manipulation of the transverse members, the connection may be disengaged without injury or damage to either the transverse members 12 and 14 or the support member 10. Also, this disengagement procedure requires minimal movement of the transverse members. Further, the sequence of manuevers is sufficiently complex to prohibit the unexpected and unwanted disengagement of the connection.

Figure 5:
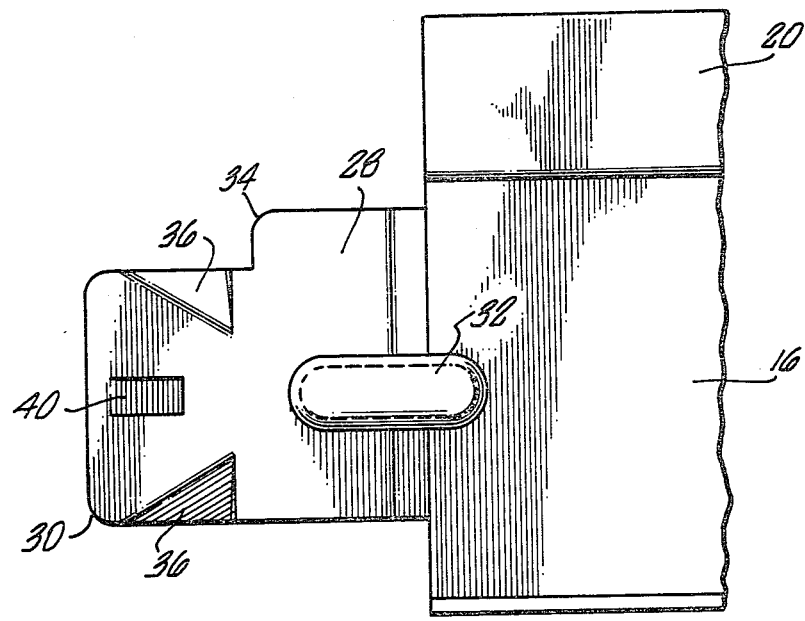
FIG. 5 is a side view of a transverse member having a tongue of an alternate version.
Figure 6:
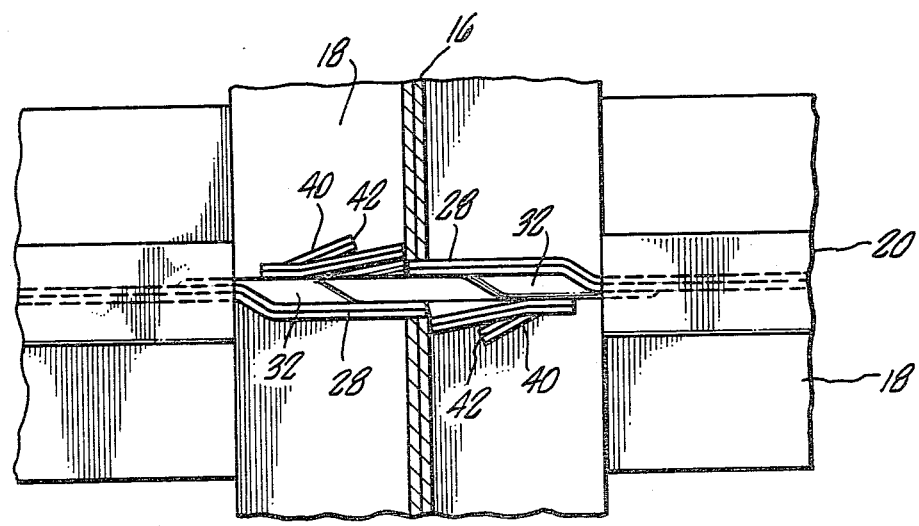
FIG. 6 is a top view of an assembled grid section showing the alternate version of the tongue.

An alternate version of the tongue 26 is shown in FIGS. 5 and 6. It has been discovered that in certain instances during assemblage of the grid system the first transverse member inserted into the support member will slip out before the second transverse member can be inserted to complete the joint. Accordingly, a retainer tab 40 can be easily formed in insert 30 of either or both members 12 and 14. Tab 40 will form shoulder 42 which extends a distance away from insert 30 such that the overall width of insert 30 with tab 40 is slightly less than the width of hole 24. Therefore, after the insert 30 of the first transverse member is positioned within hole 24, the retainer tab 40 and shoulder 42 will prevent the insert 30 from easily withdrawing before the second transverse member is inserted. It should be noted, however, that by including retainer tab 40 the ability to easily disassemble the joint may be lost. In order to retain this feature, the overall width of insert 30, including tab 40, should be less than the free space remaining in hole 24 after the opposing transverse member has been inserted. In addition, the distance between the shoulder 42 and shoulders 38 should be sufficiently large to allow insert 30 to be withdrawn from bead 32 before shoulder 42 engages the edge of hole 24. In this way, the above-described disassembly procedure will not be adversely affected.

Accordingly, a new and improved locking connection for a grid system has been shown and described. While embodiments and application of the invention have been disclosed, it will be apparent to those skilled in the art that many modifications are possible without departing from the inventive concepts herein described.

The invention, therefore, is not to be restricted by the above description but is of the full breadth of the appended claims.

What is claimed is:

1. An apparatus for constructing a grid system comprising a support member and a pair of opposing transverse members, said support and transverse members having a similar cross-sectional configuration comprising a central web and lower flanges; a rectangular hole in the web of said support member; a tongue extending longitudinally from the web of each transverse member, said tongue having a tab portion adjacent to said web and an insert portion which communicates with said rectangular hole; said tongue being offset a distance from the plane of the web of said transverse member; shoulder means on said tongue to abut said web of said support member upon insertion of said insert portion into said hole; upper and lower shoulder means on said insert portion which face said transverse member for engagement of said web of said support member adjacent to said rectangular hole at the upper and lower ends of said hole; and wedge means on said transverse members for retaining said shoulder means on said insert portion in position against said web, said insert portion having sufficient longitudinal length to engage said wedge means on the opposing transverse member.

2. The apparatus of claim 1 wherein said shoulder means on said insert portion comprises wing-like deformations of the corners of said insert portion, which corners are adjacent to said tab portion, said deformation of said corners extending away from the side of said tab which has said wedge means.

3. The apparatus of claim 1 wherein said wedge means comprises a reinforcement bead located on said tab portion and said web, said bead positioned transversely across the connection line between said tab portion and said web.

4. The apparatus of claim 3 wherein said reinforcement bead is centrally located on said tab portion.

5. The apparatus of claim 2 or 3, or 4 where said shoulder means on said tongue is formed by a reduction in the width of said insert portion relative to said tab portion.

6. An apparatus for constructing a grid system comprising a support member; a pair of opposing transverse members, said support and transverse members having a similar cross-sectional configuration comprising a central web, lower flanges and an upper tubular portion; a rectangular hole in the web of said support member; a tongue extending longitudinally from the web of each transverse member, said tongue being offset a distance from the plane of the web of said transverse member, said tongue having a tab portion adjacent to said web and an insert portion which communicates with said rectangular hole; a reinforcement bead centrally located on said tab portion and positioned transversely to the connection line between said tab portion and said transverse member; shoulder means upon said tongue for abutting said web of said support member upon insertion of said insert portion into said hole; shoulder means on said insert portion for engaging said web of said support member adjacent to said rectangular hole at the upper and lower ends of said hole, said shoulders formed by deforming the upper and lower corners of said insert portion, which corners are adjacent to said tab portion; and wedge means on said transverse members for retaining said shoulder means into position against said web.

7. The apparatus of claim 6 wherein said wedge means comprises a reinforcement bead located on said tab portion and on said web, said bead positioned transversely across the connection line between said tab portion and said web.

8. The apparatus of claim 7 further comprising a retainer tab formed in said insert portion, said retainer tab extending a distance outwardly from said insert portion to form a shoulder facing said web of said transverse member.

* * * * *